US008281188B2

(12) United States Patent
Miller (10) Patent No.: US 8,281,188 B2
(45) Date of Patent: Oct. 2, 2012

(54) DATA PROCESSING SYSTEM WITH PERIPHERAL CONFIGURATION INFORMATION ERROR DETECTION

(76) Inventor: Gary L. Miller, Austin, TX (US)

(*) Notice: Subject to any disclaimer, the term of this patent is extended or adjusted under 35 U.S.C. 154(b) by 124 days.

(21) Appl. No.: 12/851,094

(22) Filed: Aug. 5, 2010

(65) Prior Publication Data

US 2012/0036400 A1 Feb. 9, 2012

(51) Int. Cl.
*G06F 11/00* (2006.01)
(52) U.S. Cl. .............................. 714/44; 714/5.1; 719/327
(58) Field of Classification Search ................... 714/5.1, 714/36, 40, 43, 44; 710/110; 719/327
See application file for complete search history.

(56) References Cited

U.S. PATENT DOCUMENTS

| 5,231,640 | A |   | 7/1993 | Hanson et al. |
| 5,553,231 | A |   | 9/1996 | Papenberg et al. |
| 5,654,962 | A |   | 8/1997 | Rostoker et al. |
| 5,809,329 | A | * | 9/1998 | Lichtman et al. ................. 710/8 |
| 6,336,176 | B1 | * | 1/2002 | Leyda et al. .................... 711/170 |
| 6,546,482 | B1 |   | 4/2003 | Magro et al. |
| 6,804,741 | B2 |   | 10/2004 | Cowan |
| 7,007,203 | B2 | * | 2/2006 | Gorday et al. ................... 714/37 |
| 7,293,204 | B2 | * | 11/2007 | Lu et al. .......................... 714/44 |
| 7,401,234 | B2 |   | 7/2008 | Case et al. |
| 7,426,678 | B1 |   | 9/2008 | Cory et al. |
| 7,725,803 | B1 | * | 5/2010 | Tang et al. ..................... 714/758 |
| 7,949,874 | B2 | * | 5/2011 | Lewis et al. ................... 713/170 |
| 7,958,276 | B2 | * | 6/2011 | Storey et al. ....................... 710/8 |
| 8,010,871 | B1 | * | 8/2011 | Kow et al. ...................... 714/758 |
| 2003/0055552 | A1 | * | 3/2003 | Akins et al. .................... 701/114 |
| 2005/0066073 | A1 | * | 3/2005 | Jacobs et al. .................... 710/15 |
| 2005/0071730 | A1 | * | 3/2005 | Moyer et al. ................... 714/758 |
| 2010/0191933 | A1 |   | 7/2010 | Sonnekalb |

FOREIGN PATENT DOCUMENTS

EP  1431878 A2  6/2004

OTHER PUBLICATIONS

Siewiorek; "Fault Tolerance & Memory Hierarchy"; Nov. 23, 1998; pp. 1-18; Carnegie Mellon.
Yoon et al.; "Virtualized and Flexible ECC for Main Memory"; ASPLOS'10; Mar. 13-17, 2010; ACM.

* cited by examiner

*Primary Examiner* — Marc Duncan
(74) *Attorney, Agent, or Firm* — David G. Dolezal; Joanna G. Chiu (57) ABSTRACT

In a data processing system including a first master operably coupled to a peripheral bus interface and a plurality of peripherals operably coupled to the peripheral bus interface, wherein the first master communicates with each of the plurality of peripherals via the peripheral bus interface, a method includes initiating a write, by the first master, of configuration information to a first peripheral of the plurality of peripherals. In response to initiating the write, the configuration information is provided via the peripheral bus interface for storage into the first peripheral, wherein a first error syndrome of the configuration information is generated by the peripheral bus interface. The provided configuration information is stored in the first peripheral, and the first error syndrome is stored in storage circuitry of the peripheral bus interface. The first error syndrome can be used to check the integrity of configuration information during subsequent error checking.

21 Claims, 4 Drawing Sheets

DATA PROCESSING SYSTEM WITH PERIPHERAL CONFIGURATION INFORMATION ERROR DETECTION

BACKGROUND OF THE INVENTION

1. Field of the Invention

This invention relates in general to data processing systems and more specifically to error detection of peripheral configuration information stored in a peripheral.

2. Description of the Related Art

Data processing systems are used for handling information and for controlling the operations of other systems. Examples of data processing systems include computers (stand alone, laptops), cell phones, PDA's, touch pads, cellular phones, electronic readers, and control systems for various systems such as automobiles, planes, networking equipment, and manufacturing equipment.

Typically, data processing systems include one or more processors for performing operations on data, one or more memories for storing the data and for storing instructions, and one or more peripherals that serve as interfaces for obtaining data and/or using the data generated by the processor.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

As described herein, a data processing system includes a system for performing error detection of configuration information written to configuration storage circuitry of peripherals of the data processing system. In some examples, the error detection is performed at a peripheral interface by reading information from configuration registers of the peripherals via the peripheral interface. Error detection schemes can be performed on the read information.

Figure 1:
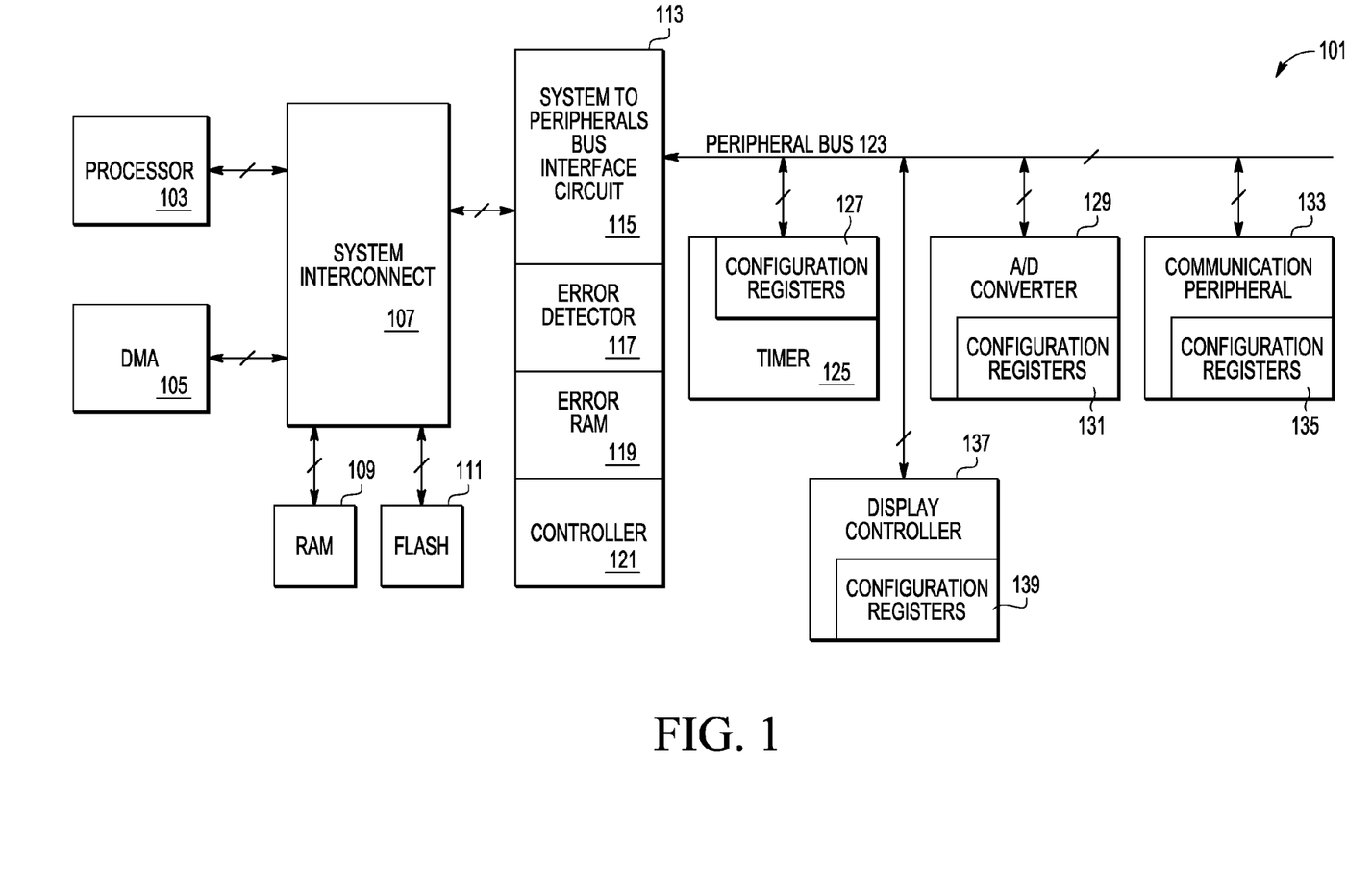
FIG. 1 is a block diagram of a data processing system according to one embodiment of the present invention.

FIG. 1 is a block diagram of a data processing system according to one embodiment of the present invention. Data processing system 101 includes a processor 103, a DMA controller 105, RAM 109, flash memory 111, and peripheral bus interface 113 for interfacing with peripherals such as peripherals 125, 129, 133, and 137 via a peripheral bus 123. In some embodiments, a peripheral interface can be implemented as a gateway or bridge. System 101 includes a system interconnect 107 for communicatively coupling processor 103, DMA controller 105, RAM 109, flash memory 111 and interface 113. Processor 103 may be a single core processor or a multi-core processor. In one embodiment, system interconnect 107 is a computer bus. In other embodiments, system interconnect is a cross bar switch circuit. In other embodiments, system 101 may include other devices (e.g. clocks, voltage regulators, other processors, memory controllers, or other memory devices) not shown. In other embodiments, system 101 may have other configurations.

In one embodiment, system 101 is a control circuit for an automobile. But in other embodiments, system 101 can be other types of data processing systems. In one embodiment, the devices shown in FIG. 1 are implemented on a single integrated circuit die, but may be implemented with multiple integrated circuit die in other embodiments.

Data processing system 101 includes a timer peripheral 125, an analog to digital converter peripheral 129, a communication peripheral 133, and a display controller peripheral 137. A timer peripheral is a device that provides outputs based on a time base (e.g. a clocked counter or crystal oscillator) or associates inputs with a time base. An analog to digital circuit translates analog signals to digital signals. A communications peripheral is used to communicate with other devices including other data processing systems by a communications media (e.g. a wired or wireless media). Examples of communications peripherals includes a UART controller, a USB controller, a controller area network (CAN) controller, or wireless modem. Display controller peripheral 137 is used to control the display of information provided by data processing system 101 on a display (not shown) in human readable form. System 101 may include other types of peripherals such as a digital to analog converter, a keyboard, a mouse, actuators, sensors, touch pads, and graphics controllers (none shown).

Each peripheral includes configuration storage circuitry which is shown in FIG. 1 as configuration registers 127, 131, 135, and 139. Configuration storage circuitry are storage locations that store configuration information for the peripheral. Configuration storage circuitry can be implemented with stand alone memory devices or as a specific location or locations of a memory device that stores other information for the peripheral as well.

Configuration information for a peripheral is information used to indicate how the peripheral will operate. A peripheral uses the configuration information to control aspects of its operation such as parameter control, feature enablement, and mode control.

Examples of configuration information for a timer circuit include information indicating timer function for each channel, variables for timer function, time base selection, resolution selection, input filter selection, and interrupt enablement. Examples of A/D converter configuration information include information indicating sample rate, conversion accuracy, conversion resolution, single or differential conversions, triggers on when to do the conversion, and interrupt enablement. Examples of configuration information for communications peripherals includes information indicating transfer rates, frequency, message filtering type and enablement, transmit queue commands, transmit queue data, package configuration and size, interrupt enablement, and protocol implementation (e.g. RTZ, NRTZ). Timer circuits, A/D converters, and communications peripherals may include other types of configuration information. Also other types of peripherals may have other types of configuration information.

Configuration information is written to the configuration storage circuitry of a peripheral by processor 103 (or other data master of system 101) either during startup or during operation to change the configuration information. In one embodiment, processor 103 obtains the configuration information from RAM 109, flash memory 111, or generates it by processor operations. In one embodiment, the processor initiates a write command to the logical memory address of the configuration register of the peripheral. The write command is conveyed via the system interconnect 107 to the peripheral interface where the system to peripheral bus interface circuit 115 converts the logical address to the physical address of the designated register on peripheral bus 123. After the writing of the configuration information, the peripheral uses the configuration information in its operation.

Figure 2:
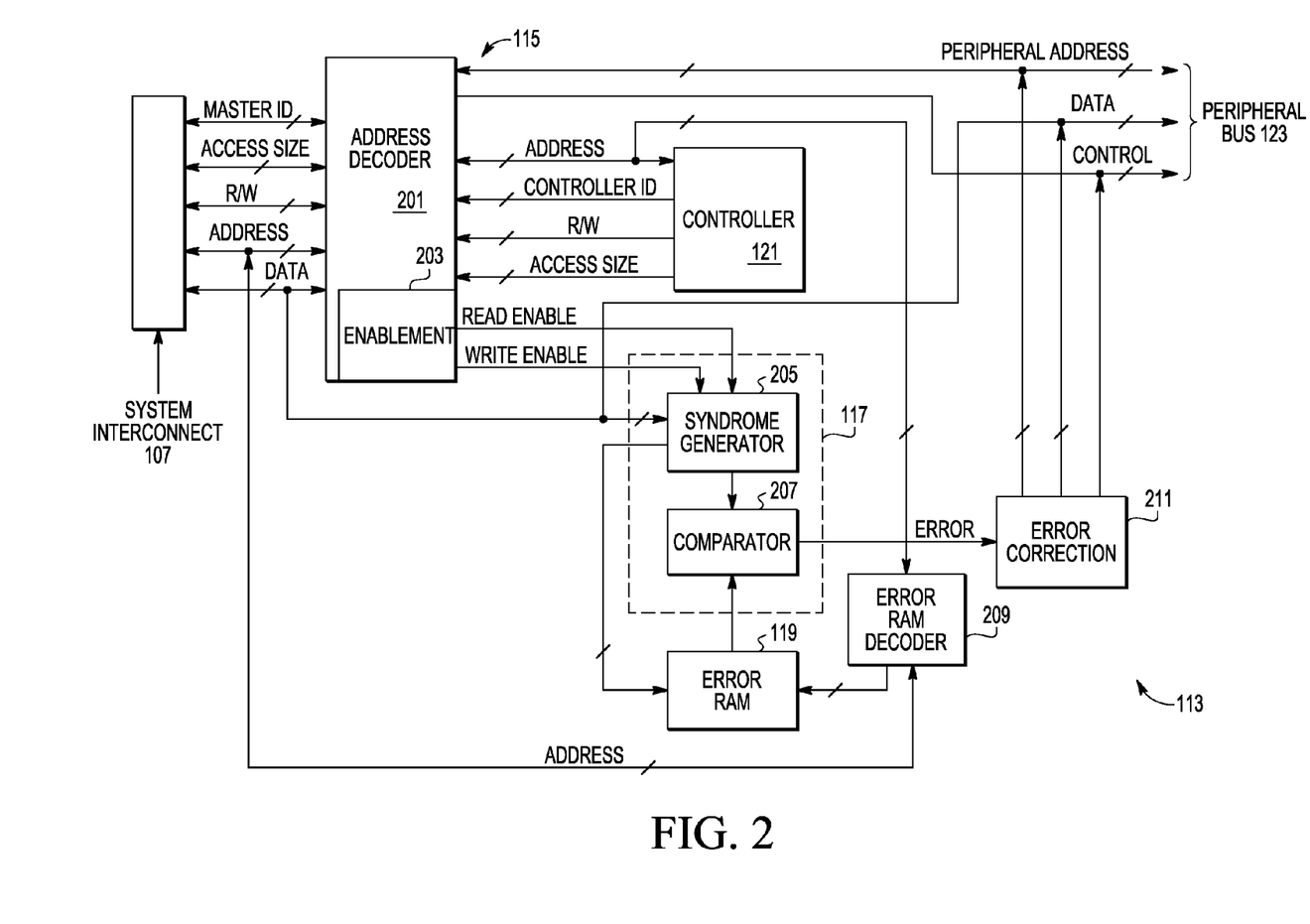
FIG. 2 is a block diagram of peripheral interface according to one embodiment of the present invention.

FIG. 2 is a block diagram of peripheral bus interface 113 according to one embodiment of the present invention. In the embodiment of FIGS. 1 and 2, peripheral bus interface 113 includes circuitry for generating error syndromes of the configuration information written by a processor or other master of system 101 to configuration registers and for storing those syndromes. Subsequent to the writing of the configuration information, the configuration information can be read via the peripheral interface where a new error syndrome is generated by peripheral bus interface 113 and compared with the previously generated error syndrome to determine if the configuration register information of a peripheral has been corrupted.

In the embodiment of FIG. 2, bus interface circuit 115 includes an address decoder 201 that receives signals indicative of a data transaction from system interconnect 107 that was generated by a data processing system master (e.g. processor 103, DMA controller 105). The specific signals shown include a master ID indication, a R/W indication, address signals, data signals, and other transaction attributes such as access size, etc. Address decoder 201 decodes the address provided on the address signal lines from interconnect 107 and provides the corresponding peripheral bus address of the address lines of peripheral bus 123.

Error detector 117 includes a syndrome generator 205 for generating an error syndrome of information conveyed on the data lines between system interconnect 107 and peripheral bus 123. An error syndrome is a representation of a data unit that is typically represented by less data bits than the data unit and that is used for subsequent error detection and/or correction of the data unit. Examples of an error syndrome include a parity bit, a hamming code, an error correction code, or a hashing code. Some error syndromes can be used to detect one error in a data unit. Others can be used to detect multiple errors in a data unit. Some codes can detect two error bits and correct one bit in a data unit.

The generated syndromes for data writes to the configuration storage circuitry of the peripherals are stored in error RAM 119. The address for storing a syndrome in error RAM 119 is generated by error RAM decoder 209 from the address from system interconnect 107. In other embodiments, decoder 209 generates the error RAM address from the peripheral bus address.

Address decoder 201 includes enablement circuit 203 that detects when a data transaction is a write transaction of predetermined access size of configuration information to a configuration storage circuitry of a peripheral and asserts a WRITE ENABLE signal to syndrome generator 205 in response thereto. Likewise, enablement circuit 203 detects when a data transaction is a read transaction of predetermined access size of configuration information to a configuration storage circuitry of a peripheral and asserts a READ ENABLE signal to syndrome generator 205 in response thereto. In one embodiment, the WRITE ENABLE signal is generated when the R/W and access size signals indicate a word write and the ADDRESS signals from system interconnect 107 indicates an address that is mapped a location of a configuration storage circuit of a peripheral. In some embodiments, the WRITE ENABLE would be generated based upon a particular master (as indicated by the MASTER ID signals) initiated the write to a configuration storage circuit. In one embodiment, the READ ENABLE signal is generated when the R/W and access size signals indicate a word read and the ADDRESS signals from system interconnect 107 indicates an address that is mapped to a location of a configuration storage circuit of a peripheral. In some embodiments, the READ ENABLE would be generated based upon a particular master initiating the read to a configuration storage circuit.

When a write of peripheral information to a configuration storage circuitry generates the WRITE ENABLE signal, syndrome generator 205 generates a syndrome of the written information and stores that information in error RAM 119.

When a read of peripheral information from a configuration storage circuitry generates the READ ENABLE signal, syndrome generator 205 generates a syndrome of the read information. Comparator 207 compares the newly generated syndrome with the previously generated syndrome to determine if there is an error in the configuration information (as indicated by the ERROR INDICATION signal).

In one embodiment, the WRITE ENABLE and READ ENABLE signal is only generated for reads and writes of configuration information of a particular size (e.g. word). In some embodiments, syndrome generation is dependent upon the read and written information being of the same size.

In the embodiment of FIG. 2, interface 113 includes an error correction circuit 211 that is operably coupled to peripheral bus 123. Circuit 211, in response to an ERROR INDICATION signal, will write corrected error confirmation information to the configuration storage circuitry with the incorrect data. Other embodiments do not include error correction circuit 211.

Typically, during data processing system operation, the configuration information of a peripheral is not normally read. Accordingly, to continuously monitor the integrity of the configuration information, data processing system 101 includes circuitry for performing reads of the configuration information of peripheral, were error detector 117 can generate syndromes of the information read to detect errors.

In the embodiment shown, controller 121 is used to generate, via address decoder 201 and peripheral bus 123, read transactions of the configuration information of a peripheral for error checking of that information. In the embodiment shown, controller 121 initiates a read transaction by providing address signals indicating the desired peripheral storage circuit address to be read, an ID indicating that the controller is initiating the read, and an R/W signal to indicate a read, and an access size signal to indicate the appropriate size of the read information. The address is also provided to an error RAM decoder 209 for retrieving the syndrome generated previously when the configuration information was previously written to that location. In one embodiment, controller 121 is implemented with a state machine but may be implemented in other ways in other embodiments.

In one embodiment, controller 121 generates periodic reads to the configuration storage circuitry of the peripherals of data processing system. The frequency of such reads is based on a desired time to ensure integrity of the configuration information. In one embodiment, configuration information would be read from the peripherals at any time when the peripheral bus is not being used. In one such embodiment, configuration information reads initiated by controller 121 would be continuously performed during those times when bus 123 is not in use. In an other embodiment, the reads would occur at regularly scheduled times where other peripheral bus activity would be delayed until the configuration read is complete.

One advantage of using circuitry of peripheral bus interface 113 (such as controller 121) for initiating reads of peripheral configuration information is that it does not require processing time of processor 103 or other data system master (e.g. DMA controller 105) to check the integrity of the peripheral configuration information. If processor 103 or DMA (direct memory Access) controller 105 were used to read peripheral configuration information, then not only would that master be utilized to perform the reads, but system interconnect 107 would also be occupied for the reads. Accordingly, configuration information integrity can be performed while minimizing the impact on data processing system 101. In addition, in some embodiments, controller 121 can be designed with simpler or lower power circuitry wherein read initiations by controller 121 consume less power than reads initiated by processor 103.

In other embodiments, integrity reads of peripheral configuration information can be initiated by a system interconnect master (e.g. processor 103 or controller 105). In one embodiment, using a DMA controller to initiate reads of peripheral configuration information allows for the use of existing circuitry for performing configuration integrity operations. In addition, using the DMA controller can free up the processor 103 from performing the read initiations.

Furthermore, in some embodiments, the commands for DMA controller 105 to perform the configuration information reads can be programmed in the DMA controller to occur autonomously. Using processor 103 to initiate the configuration information reads may require the use of code to perform the operations.

In the embodiment shown, the syndromes generated for each peripheral are stored in RAM 119 in interface 113. Storing the syndromes in the interface advantageously reduces the time to make a read or write on configuration information to the peripheral. If the syndromes were stored in the peripheral, then more data would have to be exchanged with the peripheral device for configuration information checking.

Furthermore, performing error checking operations of configuration information at peripheral bus interface 113, allows for error checking of peripheral configuration information without having to implement error checking circuitry in each peripheral, thereby saving die area.

Furthermore, implementing both the error checking circuitry and syndrome storage in interface 113 allows for implementation of different configurations of peripherals in a data processing system. In some embodiments, modifications to the peripherals do not have to be made to implement integrity checking of peripheral configuration information. Thus, with the error checking circuitry and syndrome storage at the interface 113, the implementation of integrity checking of peripheral configuration information may be achieved with less coordination between the peripheral manufacturer and data processing manufacturer as opposed to systems where integrity checking of the configuration information is made at the peripheral.

Checking the integrity of peripheral configuration information may provide for a more robust and reliable data processing system. Accordingly, a peripheral of a data processing system is less likely to be infective if the integrity of the configuration information is maintained.

In one embodiment, interface 113 may be located in a contiguous area of an integrated circuit. However, in other embodiments, interface 113 may be distributed throughout an integrated circuit. Furthermore, other embodiments may have different configurations of interface 113 including different operable couplings of the circuitry of interface 113. In one embodiment, error RAM 119 is a dedicated RAM circuit. In other embodiments, RAM 119 would be a designated location of system memory. In some embodiments, the function of RAM 119 may be implemented in a register of flip flops which store the multiple syndromes generated by generator 205 during configuration information writes. Also in other embodiments, some of the circuitry of 113 may be operably coupled via busses.

Figure 3:
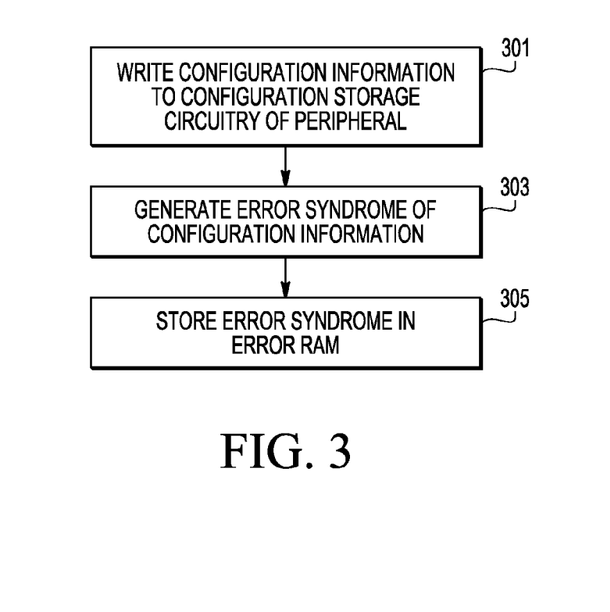
FIG. 3 is a flow diagram of a write operation to a configuration register of a peripheral according to one embodiment of the present invention.

FIG. 3 is a flow diagram illustrating one embodiment of a write operation of configuration information to a peripheral and the generation of a syndrome of that information. In operation 301, the processor or other system master initiates a write transaction to write configuration information to configuration storage circuitry (e.g. a configuration register or other type of storage location) of a peripheral (e.g. one of peripherals 125, 129, 133, or 137). The write transaction is made via system interconnect 107, bus interface circuit 115 (including decoder 201), and peripheral bus 123 to the peripheral. During the write, enablement circuit 203 detects by reading the address and the access size, that the write is to peripheral configuration storage circuitry of a peripheral (and is of a particular size in some embodiments) and enables (by assertion of the WRITE ENABLE SIGNAL) generator 205 to generate a syndrome of the write data from the data bus of system interconnect 107 in operation 303. In operation 305, the generated syndrome is stored in error RAM 119 at a location generated by decoder 209 from the address on the address lines from interconnect 107.

Figure 4:
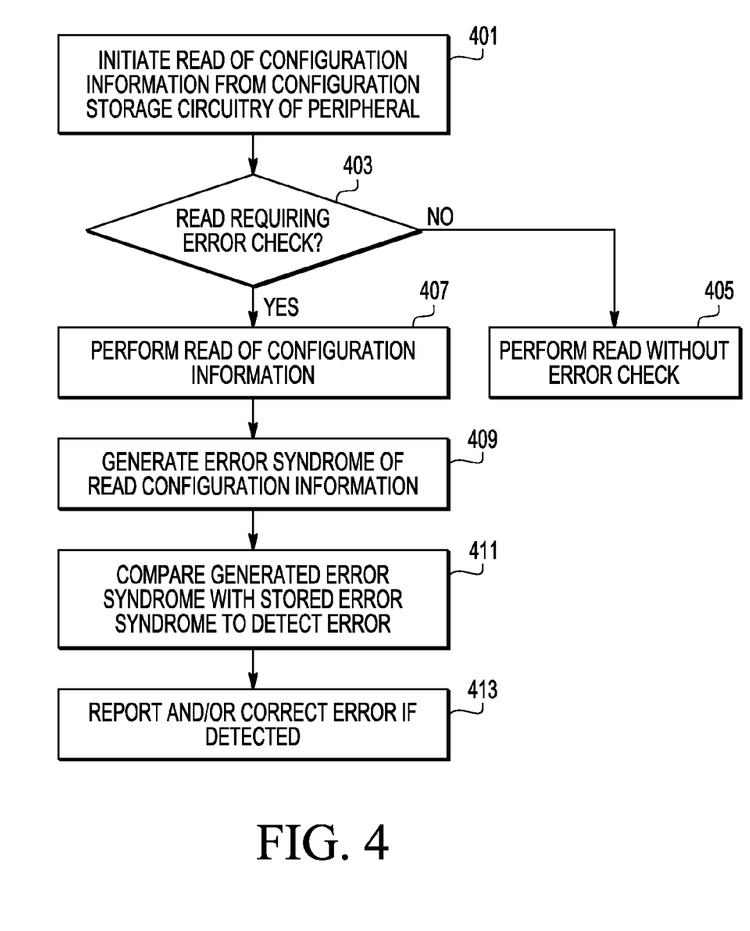
FIG. 4 is a flow diagram of a read operation of a configuration register of a peripheral according to one embodiment of the present invention.

FIG. 4 is a flow diagram showing one embodiment of reading and checking peripheral configuration information. In operation 401, an initiation of a read of peripheral configuration information is made. This initiation can be made by controller 121, processor 103, controller 105, or other circuitry of system 101.

In operation 403, a determination is made whether the read transaction requires error checking. In one embodiment, error checking is only made on information requested by a particular master or controller 121 and/or is of a particular size. For example, in a system where controller 121 initiated the configuration information integrity reads, a read of a configuration storage circuitry of a peripheral by processor 103 would not generate error checking. Accordingly, the determination of whether error checking is to be performed is determined by the device ID signal from interconnect 107 and controller 121 a well as whether the read is in the I/O mapped space of the configuration storage circuit of a peripheral (as determined by the address from interconnect 107 or controller 121) and the size of the read (as determined by the access size signals from interconnect 107 or controller 121).

If the read does not require error checking, then in operation 405, the read is performed without error checking. If the read does require error checking, then in operation 407, the read is performed and in operation 409, an error syndrome is generated by generator 205 of the configuration information that is read. In operation 411, comparator 207 compares the generated syndrome with the syndrome stored in RAM 119. If the syndromes match, then there is no error in the configuration information. However, if the syndromes do not match, then an ERROR Signal is generated and/or, in some embodiments, the error is corrected by circuit 211 writing corrected information to configuration storage circuitry. In some embodiments, if an error is found in the configuration information, the ERROR signal is used to generate an interrupt indicating that an error has been found in the peripheral configuration information. In some embodiments, the interrupt would only be generated when the error could not be corrected by error correction circuit 211.

In some embodiments, error checking is performed for every read of peripheral configuration information.

Figure 5:
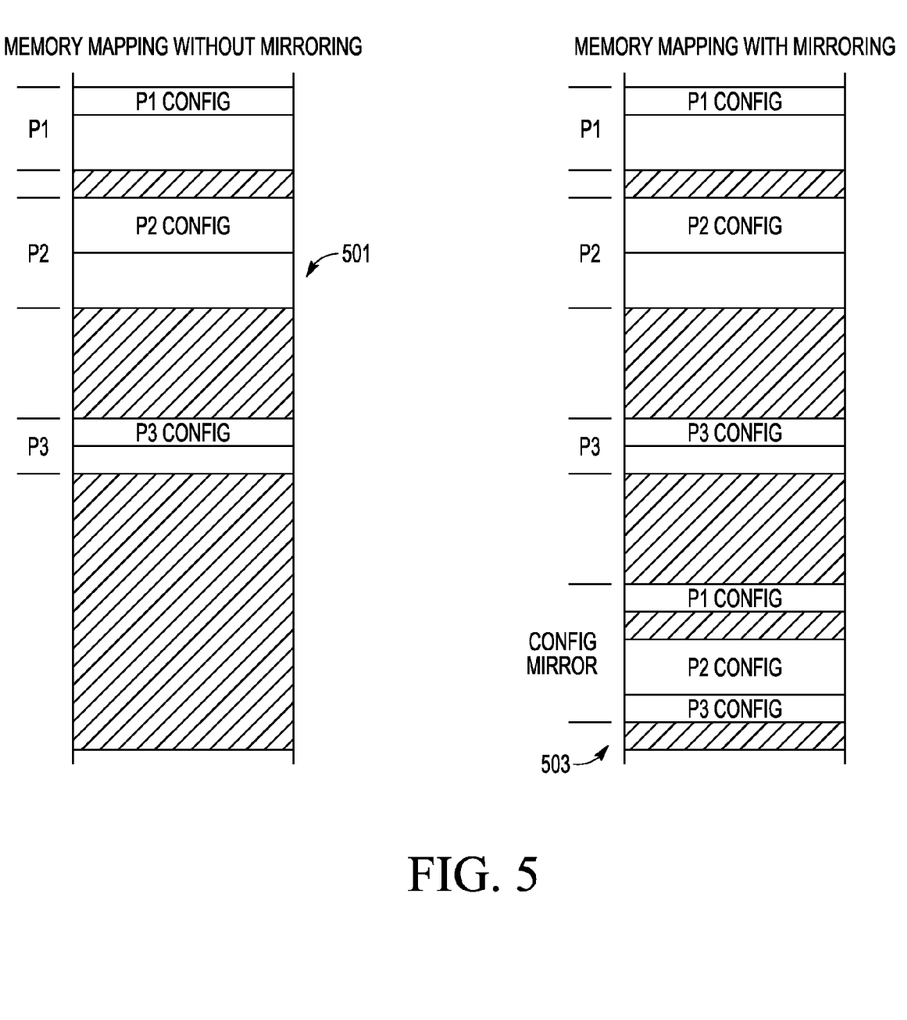
FIG. 5 shows two embodiments of memory maps for a peripheral interface according to the present invention.

FIG. 5 shows the memory map configurations for two different embodiments of the present invention. Each memory represents a mapping of memory addresses of the peripherals in the memory address space of the data processing system 101. Map 501 shows an embodiment, where the configuration information for each peripheral is located within the address ranges for all stored information of the peripheral. For example, the address ranges for peripheral 1 are indicated by "P1" on the left hand side of map 501. A portion of those ranges as indicated by "PI config" is the address range for the configuration storage register of that peripheral. Address ranges in FIG. 5 represent the logical address of the locations as utilized by processor 103. Those addresses are mapped to the addresses of the peripheral bus by decoder 201.

In the embodiment of FIG. 501, any data accesses to the configuration storage circuitry of a peripheral would be initiated by providing the addresses shown by the memory map to address decoder 201. Thus, in an embodiment where controller 121 is initiating configuration information, controller would provide the same logical address as processor 103 in writing data to those configuration storage circuits.

Map 503 shows an embodiment that includes a mirrored mapping of the addresses of the peripheral configuration storage circuitry. With this embodiment, two different logical address are given for each configuration storage location. The circuitry that initiates a read to check the integrity of the peripheral configuration information would use a different logical address than that used by processor 103 in writing to the same configuration storage circuitry of a peripheral. Both locations of map 503 for a configuration storage location would map to the same peripheral bus physical address.

In one embodiment, using a mirrored mapping scheme allows for the determination of whether to perform an error check on data based on which address is being provided to decoder 201. For example if the address of the configuration mirrored area of a map (designated as "config mirror" in FIG. 5) is provided, then error checking would be performed on the configuration information that is read. If the address that is not located in the mirrored region is provided, then no error checking is performed.

With the embodiment of map 503, the logical address of the configuration storage locations in the mirrored region of map 503 is compressed with respect to the non mirrored region. A circuit accessing the mirrored region would require less address range information than in accessing the non mirrored region. Thus, a circuit such as controller 121 that initiates the configuration integrity reads could be implemented with less address bit generation circuitry.

In one embodiment, the logical addresses of the configuration storage circuitry of the peripherals are hardwired in controller 121 or in other devices of the data processing system. However, in other embodiments, the logical addresses of each peripheral configuration storage circuitry would be designated by register programmable values that would be set during start up of system 101. Also, the address range for the configuration information of each peripheral could also be programmed in a register (e.g. during startup) to define the space of the configuration region. In one embodiment, those registers (not shown) would reside in controller 121. In another embodiment, the registers would reside in the DMA controller 105. However, the registers could be in other locations of system 101.

Implementing a mirrored mapped region for peripheral configuration storage locations may allow in some embodiments, for a reduction in the number of registers needed to define the locations of the peripheral configuration storage circuitry. For example, with non mirrored mapping, two registers would be needed for each peripheral, one register to define the starting address for the configuration information and a second register to include the length of the address range. If the logical addresses of the configurations storage circuits of the mirrored regions are compressed together, then just two registers would be needed for all peripherals, one to define the starting address of the mirrored region and the second one to include the length of the mirrored region.

In one such embodiment, controller 121 would include a counter whose starting value is programmed with the starting address of the mirrored region and whose length of the count is programmed with the size of the mirrored region. Each change in the counter value would initiate a new read address for reading configuration information of a peripheral. In one embodiment, the counter would be reset back to the starting number at the end of the count. In one embodiment, the controller would receive an "in use" signal from the address decoder 201 that would stop the counter when the peripheral bus is in use by a system master to pause the configuration integrity reads. The reads would resume when the peripheral bus is idle.

In other embodiments, controller 121 is configured to provide the peripheral bus addresses for the configuration reads directly to the peripheral bus. In other embodiments, controller 121 includes an enable signal input that allows the operating system to disable the peripheral configuration information error checking function e.g. for power saving purposes. In other embodiments, system 101 includes a switch circuit to isolate the data lines of system interconnect 107 from the data lines of peripheral bus 123 to allow the configuration information integrity checking to be performed while the system interconnect is being utilized for other purposes.

In one embodiment, in a data processing system including a first master operably coupled to a peripheral bus interface and a plurality of peripherals operably coupled to the peripheral bus interface, wherein the first master communicates with each of the plurality of peripherals via the peripheral bus interface, a method includes initiating a write, by the first master, of configuration information to a first peripheral of the plurality of peripherals. The method also includes in response to initiating the write, providing the configuration information via the peripheral bus interface for storage into the first peripheral, wherein a first error syndrome of the configuration information is generated by the peripheral bus interface. The method further includes storing the configuration information in a first storage location of the first peripheral and storing the first error syndrome in storage circuitry of the peripheral bus interface.

In another embodiment, in a data processing system including a first master operably coupled to a peripheral bus interface and a plurality of peripherals operably coupled to the peripheral bus interface, wherein the first master communicates with each of the plurality of peripherals via the peripheral bus interface, a method includes providing configuration information via the peripheral bus interface for storage into a first peripheral of the plurality of peripherals. A first error syndrome of the configuration information is generated by the peripheral bus interface. The method includes storing the configuration information provided via the peripheral bus interface in the first peripheral, storing the first error syndrome in storage circuitry of the peripheral interface, and initiating a read of the configuration information stored in the first peripheral after the storing of the configuration information. The method includes in response to the initiating the read, receiving the configuration information from the first peripheral. A second error syndrome of the configuration information received from the first peripheral is generated by the peripheral bus interface and compared to the first error syndrome to determine if an error exists in the configuration information received from the first peripheral.

In another embodiment, a data processing system includes a first master and a peripheral bus interface. The first master is operably coupled to the peripheral bus interface. The data processing system includes a plurality of peripherals operably coupled to the peripheral bus interface. The first master communicates with each of the plurality of peripherals via the peripheral bus interface. The first master initiates storage of configuration information into each of the plurality of peripherals. When the configuration information is provided for storage into each of the plurality of peripherals, an error syndrome for the configuration information for each of the plurality of peripherals is generated by the peripheral bus interface and stored in storage circuitry of the peripheral bus interface.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. In a data processing system including a first master operably coupled to a peripheral bus interface and a plurality of peripherals operably coupled to the peripheral bus interface, wherein the first master communicates with each of the plurality of peripherals via the peripheral bus interface, a method comprising:
   initiating a write, by the first master, of configuration information to a first peripheral of the plurality of peripherals;
   in response to initiating the write, providing the configuration information via the peripheral bus interface for storage into the first peripheral, wherein a first error syndrome of the configuration information is generated by the peripheral bus interface;
   storing the configuration information in a first storage location of the first peripheral;
   storing the first error syndrome in storage circuitry of the peripheral bus interface;
   reading the configuration information from the first storage location after the storing the configuration information;
   generating by the peripheral bus interface a second error syndrome of the configuration information read from the first storage location from the reading the configuration information;
   comparing the first error syndrome with the second error syndrome to determine if an error exists in the configuration information read from the first storage location;
   wherein the first master initiates the write of the configuration information stored in the first peripheral in accordance with a first memory mapping of the plurality of peripherals, and the reading of the configuration information stored in the first peripheral is initiated in accordance with a second memory mapping of the plurality of peripherals, different from the first memory mapping.

2. The method of claim 1, wherein the reading, the generating, and the comparing are performed periodically to determine if an error exists in the configuration information from the first storage location.

3. In a data processing system including a first master operably coupled to a peripheral bus interface and a plurality of peripherals operably coupled to the peripheral bus interface, wherein the first master communicates with each of the plurality of peripherals via the peripheral bus interface, a method comprising:
   initiating a write, by the first master, of configuration information to a first peripheral of the plurality of peripherals;
   in response to initiating the write, providing the configuration information via the peripheral bus interface for storage into the first peripheral, wherein a first error syndrome of the configuration information is generated by the peripheral bus interface;
   storing the configuration information in a first storage location of the first peripheral
   storing the first error syndrome in storage circuitry of the peripheral bus interface;
   reading the configuration information from the first storage location after the storing the configuration information;
   generating by the peripheral bus interface a second error syndrome of the configuration information read from the first storage location from the reading the configuration information;
   comparing the first error syndrome with the second error syndrome to determine if an error exists in the configuration information read from the first storage location;
   initiating a read of the configuration information stored in the first storage location wherein the reading is performed in response to the initiating a read;
   determining if error detection is to be performed for the read;
   wherein the generating and the comparing is performed if the determining determines that error detection is to be performed for the read;
   wherein the determining is based on which entity within the data processing system initiated the read of the configuration information stored in the first storage location.

4. The method of claim 3, wherein when the entity comprises the first master, the method further comprises determining that the comparing is not to be performed.

5. The method of claim 3, wherein when the entity comprises the peripheral bus interface, the method further comprises determining that error detection is to be performed.

6. The method of claim 3, wherein the data processing system further comprises a second master, wherein the second master is operably coupled to the peripheral bus interface and communicates with each of the peripherals via the peripheral bus interface, and wherein when the entity comprises the second master, the method further comprises determining that error detection is to be performed.

7. The method of claim 3, wherein the reading, the generating, and the comparing are performed periodically to determine if an error exists in the configuration information from the first storage location.

8. In a data processing system including a first master operably coupled to a peripheral bus interface and a plurality of peripherals operably coupled to the peripheral bus interface, wherein the first master communicates with each of the plurality of peripherals via the peripheral bus interface, a method comprising:

initiating a write, by the first master, of configuration information to a first peripheral of the plurality of peripherals;

in response to initiating the write, providing the configuration information via the peripheral bus interface for storage into the first peripheral, wherein a first error syndrome of the configuration information is generated by the peripheral bus interface;

storing the configuration information in a first storage location of the first peripheral storing the first error syndrome in storage circuitry of the peripheral bus interface;

reading the configuration information from the first storage location after the storing the configuration information;

generating by the peripheral bus interface a second error syndrome of the configuration information read from the first storage location from the reading the configuration information;

comparing the first error syndrome with the second error syndrome to determine if an error exists in the configuration information read from the first storage location;

initiating a read of the configuration information stored in the first storage location and determining if error detection is to be performed for the read;

wherein the generating and the comparing is performed if the determining determines that error detection is to be performed for the read;

wherein the determining if error detection is to be performed for the read is based on which memory map of the peripherals is used to initiate the read of the configuration information.

9. The method of claim 8, wherein when a first memory map of the peripherals is used to initiate the read, the method further comprises determining that error detection is not to be performed, and when a mirrored memory map of the peripherals is used to initiate the read, the method further comprises determining that error detection is to be performed.

10. The method of claim 8, wherein the reading, the generating, and the comparing are performed periodically to determine if an error exists in the configuration information from the first storage location.

11. In a data processing system including a first master operably coupled to a peripheral bus interface and a plurality of peripherals operably coupled to the peripheral bus interface, wherein the first master communicates with each of the plurality of peripherals via the peripheral bus interface, a method comprising:

providing configuration information via the peripheral bus interface for storage into a first peripheral of the plurality of peripherals, wherein a first error syndrome of the configuration information is generated by the peripheral bus interface;

storing the configuration information provided via the peripheral bus interface in the first peripheral;

storing the first error syndrome in storage circuitry of the peripheral bus interface;

initiating a read of the configuration information stored in the first peripheral after the storing of the configuration information; and in response to the initiating the read, receiving the configuration information from the first peripheral, wherein a second error syndrome of the configuration information received from the first peripheral is generated by the peripheral bus interface and compared to the first error syndrome to determine if an error exists in the configuration information received from the first peripheral;

initiating, by the first master, a write of the configuration information to the first peripheral, wherein the providing the configuration information is performed in response to the initiating the write;

wherein the initiating the read of the configuration information stored in the first peripheral is performed by the peripheral bus interface;

wherein the first master initiates the write of the configuration information stored in the first peripheral in accordance with a first memory mapping of the plurality of peripherals, and the peripheral bus interface initiates the read of the configuration information stored in the first peripheral in accordance with a second memory mapping of the plurality of peripherals, different from the first memory mapping.

12. The method of claim 11, further comprising:

providing second configuration information via the peripheral bus interface for storage into a second peripheral of the plurality of peripherals, wherein a third error syndrome of the second configuration information is generated by the peripheral bus interface;

storing the second configuration information provided via the peripheral bus interface in the second peripheral;

storing the third error syndrome in the storage circuitry of the peripheral bus interface;

initiating a read of the second configuration information stored in the second peripheral after the storing the second configuration information; and in response to the initiating the read of the second configuration information, receiving the second configuration information from the second peripheral, wherein a fourth error syndrome of the second configuration information received from the second peripheral is generated by the peripheral bus interface and compared to the third error syndrome to determine if an error exists in the second configuration information received from the second peripheral.

13. The method of claim 11, further comprising:

initiating, by the first master, a write of the configuration information to the first peripheral, wherein the providing the configuration information is performed in response to the initiating the write.

14. The method of claim 11 wherein the initiating a read of the configuration information stored in the first peripheral and the receiving, in response to the initiating the read, are performed periodically to determine if an error exists in the configuration information received from the first peripheral.

15. In a data processing system including a first master operably coupled to a peripheral bus interface and a plurality of peripherals operably coupled to the peripheral bus interface, wherein the first master communicates with each of the plurality of peripherals via the peripheral bus interface, a method comprising:

providing configuration information via the peripheral bus interface for storage into a first peripheral of the plurality of peripherals, wherein a first error syndrome of the configuration information is generated by the peripheral bus interface;

storing the configuration information provided via the peripheral bus interface in the first peripheral;

storing the first error syndrome in storage circuitry of the peripheral bus interface;

initiating a read of the configuration information stored in the first peripheral after the storing of the configuration information; and in response to the initiating the read, receiving the configuration information from the first peripheral, wherein a second error syndrome of the configuration information received from the first peripheral is generated by the peripheral bus interface and compared to the first error syndrome to determine if an error exists in the configuration information received from the first peripheral;

initiating, by the first master, a write of the configuration information to the first peripheral, wherein the providing the configuration information is performed in response to the initiating the write;

wherein the data processing system further comprises a second master operably coupled to the peripheral bus interface and communicates with each of the peripherals via the peripheral bus interface, and wherein the initiating the read of the configuration information stored in the first peripheral is performed by the second master.

16. The method of claim 15, further comprising:

initiating a second read by the first master of the configuration information stored in the first peripheral;

in response to the initiating the second read by the first master, receiving the configuration information from the first peripheral via the peripheral bus interface, wherein the peripheral bus interface does not perform error detection on the configuration information received from the first peripheral; and providing the configuration information received from the first peripheral to the first master.

17. The method of claim 15 further comprising:

initiating a second read by the first master of the configuration information stored in the first peripheral;

in response to the initiating the second read by the first master, receiving the configuration information from the first peripheral via the peripheral bus interface;

wherein the first master initiates the second read of the configuration information stored in the first peripheral in accordance with a first memory mapping of the plurality of peripherals, and a second master initiates the read of the configuration information stored in the first peripheral in accordance with a second memory mapping of the plurality of peripherals, different from the first memory mapping.

18. The method of claim 15 wherein the initiating a read of the configuration information stored in the first peripheral and the receiving, in response to the initiating the read, are performed periodically to determine if an error exists in the configuration information received from the first peripheral.

19. A data processing system, comprising:

a first master;

a peripheral bus interface, wherein the first master is operably coupled to the peripheral bus interface; and a plurality of peripherals operably coupled to the peripheral bus interface, wherein the first master communicates with each of the plurality of peripherals via the peripheral bus interface, and wherein:

the first master initiates storage of configuration information into each of the plurality of peripherals, wherein when the configuration information is provided for storage into each of the plurality of peripherals, an error syndrome for the configuration information for each of the plurality of peripherals is generated by the peripheral bus interface and stored in storage circuitry of the peripheral bus interface;

for error detection of configuration information, when configuration information stored in a peripheral of the plurality of peripherals is read from the peripheral and is received in the peripheral bus interface, the peripheral bus interface generates an error syndrome of the configuration information received from the peripheral and compares the error syndrome to an error syndrome generated during a write of the configuration information to the peripheral to determine if an error exists in the configuration information received from a peripheral;

a first memory mapping of the plurality of peripherals is used by the first master to initiate the storage of configuration information to the plurality of peripherals and a mirrored memory mapping, different from the first memory mapping, of the plurality of peripherals is used to initiate reads of configuration information stored in the plurality of peripherals for error detection.

20. The data processing system of claim 19, wherein the peripheral bus interface initiates the read of the configuration information stored in the peripheral for error detection.

21. The data processing system of claim 17, wherein the peripheral bus interface initiates periodically the read of the configuration information stored in the peripheral for error detection.

* * * * *